W. H. De GROOT.
Stone-Gatherer.
No. 41,283. Patented Jan. 19, 1864.
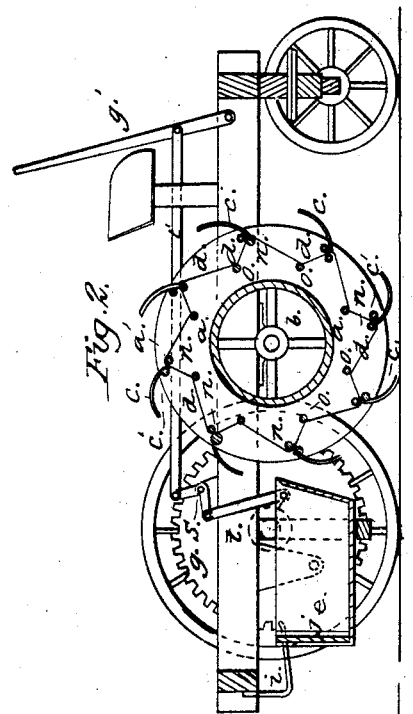
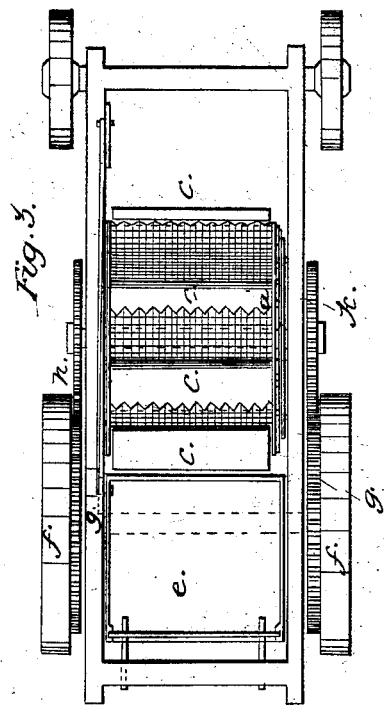
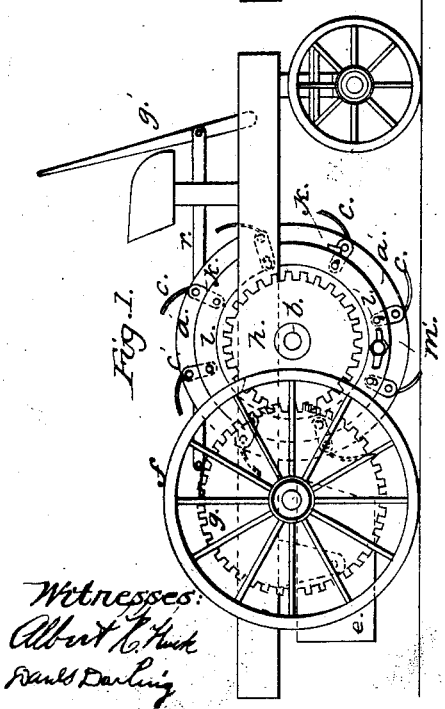
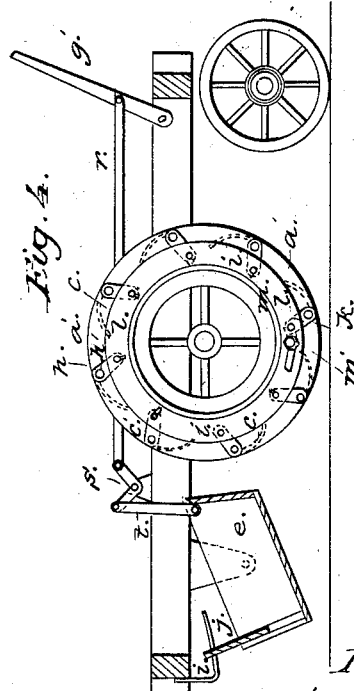

UNITED STATES PATENT OFFICE.

WM. H. DE GROOT, OF NEW YORK, N. Y.

IMPROVEMENT IN STONE-GATHERERS.

Specification forming part of Letters Patent No. 41,283, dated January 19, 1864.

*To all whom it may concern:*

Be it known that I, WILLIAM H. DE GROOT, of the city, county, and State of New York, have invented certain new and useful Improvements in Machines for Picking Stones from Farming-Ground; and I do hereby declare that the following is a full, clear, and exact description thereof, reference being had to the accompanying drawings, making part of this specification, in which—

Figure 1 is a side elevation of my improved machine. Fig. 2 is a longitudinal vertical section of the same. Fig. 3 is a plan of said machine. Fig. 4 is a vertical section, showing the pickers drawn into the wheel to which they are attached and out of the operating position. It also shows the receiving-box tilted into the proper position to discharge the gathered stones therefrom.

The first part of my invention relates to the combination, with the pickers, of a sieve or sieves in the manner hereinafter described, by which the loose earth is separated from the stones and discharged before the latter are delivered into the receiving-box.

The second part of my invention relates to the construction of the pickers and their connection with other parts in such a manner that they may be adjusted simultaneously, as hereinafter more fully set forth.

The third part of my invention relates to the arrangement of the receiving-box, in combination with a pendent back supported upon guiding-hooks, as hereinafter more fully set forth.

$a$ is a revolving cylinder, which is hung upon a shaft, $b$, which latter is hung upon a substantial frame mounted on wheels, as represented in the drawings. The cylinder $a$ is provided with a disk or flange, $a'$, at each end, which disks or flanges are sufficiently large to extend nearly to the ground. The pickers $c$ are hung upon journals or axes $c'$ in the disks $a'$ in such a manner as to be capable of having their points or working ends drawn inward toward the axle $b$ or thrown out into working position, as occasion may require. To provide the means for thus changing the position of the pickers I extend the journals $c'$ through one of the flanges $a'$ far enough to receive a short arm, $k$, which I fasten upon each of them outside of the flange. A short pin or screw is fixed in each of these arms $k$, near the outer end, for the purpose of engaging the ring $l$, which is hung upon a cylindrical flange, $m$, projecting from one of the disks $a'$. This ring $l$ is provided with elongated holes or mortises $l'$ to receive the pins or crank-wrists which project from the arms $k$.

It will be obvious from an inspection of the parts that by turning the ring $l$ the pickers may be turned into any desired position, in which they may be secured by means of the set-screw $m'$, the construction and arrangement of which will be sufficiently obvious from an inspection of the drawings.

The pickers are so constructed as to leave openings between them to allow the dirt and gravel to fall out, but not sufficiently large to allow the larger stones, which the machine is designed to gather, to escape.

To further facilitate and complete the separation of the earth from the gathered stones, I construct a sieve, $d$, of a continuous sheet of wire-cloth, extending from one to the other of the disks $a'$ and outside of the rods $n$, which extend across from disk to disk near the shaft $c'$, and are secured at each end in the said disks. Between each two of these rods $n$, I place another rod, $o$, secured in like manner, in such a position as to give the wire-cloth, when attached to them, an inward bend, which forms the sieve into the shape of a star, as represented in the drawings. This sieve may be made of perforated metal or grating instead of wire-cloth; but I prefer the construction already described. The construction of the pickers may also be varied, and they may be made of perforated sheet metal instead of fingers or bars, if preferred, though fingers are in my judgement preferable. These pickers are not intended to dig deeply into the soil, but only to gather the stones at the surface.

Motion is communicated from the traction-wheels $f$ to the pickers by means of the spur-wheel $g$, which is hung on the same shaft with the traction-wheels, meshing into another spur-wheel, $h$, on the shaft $b$.

$e$ is a box designed to receive the stone from the picking-cylinder. This box is hung on journals at each end, near the middle, as shown in the drawings. In Figs. 1 and 2 it is represented in position to receive the stone which may be brought over by the pickers and wire screen. In Fig. 4 it is represented as it appears in the operation of dumping. When in its normal position the rear end of the box $e$ is formed of a board, $j$, set in grooves in the end pieces, with an arm or projection, $i$, from the main frame passing through it. The stones, falling into the front side of this box, naturally prevent it from tipping backward, and the board $j$, bearing upon the bottom of the box and upon the arm $i$, prevents it tipping forward. It may, however, be emptied, when necessary, by means of the lever $g'$, which is located near the seat of the driver, and connected to the box $e$ by means of the connecting-rod $r$, bell-crank or bent lever $s$, and connecting-rod $t$.

The principal operations of this machine will be obvious from an inspection of the parts. It may be proper, however, to remark that the machine is intended for removing stones from the surface of loose soil, and not intended for operating on hard ground. As the stones are raised by the pickers toward the upper part of the wheel, of which they form a part, they are, by the change of the position, thrown over upon the wire-cloth or sieve, through which the remaining loose earth falls and is allowed to escape by passing outward through the lower portion of the sieve. The stones are carried over and thrown into the box, as already stated.

Having thus fully described my invention, I claim—

1. The revolving cylinder driven by the main wheels of the machine, provided with pickers $c$ and sieves $d$, constructed and operating substantially as and for the purpose set forth.

2. The construction of the revolving pickers $c$, as described, in combination with the ring $l$ and flange $m$, for adjusting the parts simultaneously, as and for the purpose set forth.

3. The arrangement of the receiving-box $e$, provided with the lifting back $j$ and guiding-hooks $i$, constructed and operating as and for the purpose set forth.

WM. H. DE GROOT.

Witnesses.
L. A. ROBERTS,
JAMES T. GRAHAM.